United States Patent
Kent (10) Patent No.: US 10,292,522 B2
(45) Date of Patent: May 21, 2019

(54) MICRO KETTLE

(71) Applicant: Progressive International Corporation, Kent, WA (US)

(72) Inventor: Joseph Kent, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 695 days.

(21) Appl. No.: 14/824,406

(22) Filed: Aug. 12, 2015

(65) Prior Publication Data
US 2016/0045056 A1    Feb. 18, 2016

Related U.S. Application Data

(60) Provisional application No. 62/038,118, filed on Aug. 15, 2014.

(51) Int. Cl.
| | |
|---|---|
| *A47J 27/21* | (2006.01) |
| *H05B 6/80* | (2006.01) |
| *A47J 27/212* | (2006.01) |
| *H05B 6/64* | (2006.01) |
| *A47J 36/02* | (2006.01) |

(52) U.S. Cl.
CPC ....... *A47J 27/21008* (2013.01); *A47J 27/212* (2013.01); *A47J 27/21058* (2013.01); *A47J 27/21166* (2013.01); *A47J 27/21175* (2013.01); *H05B 6/6408* (2013.01); *H05B 6/804* (2013.01); *A47J 27/21191* (2013.01); *A47J 36/027* (2013.01)

(58) Field of Classification Search
CPC ............ A47J 27/21008; A47J 27/21175; A47J 27/212; A47J 27/21166; A47J 27/21058; A47J 27/21191; A47J 36/027; H05B 6/804; H05B 6/6408

USPC .... 219/725–735, 687–689, 720; 99/DIG. 14, 99/344, 323; 220/762, 278; 222/472, 222/556; 426/107, 118, 241–243, 234
See application file for complete search history.

(56) References Cited

U.S. PATENT DOCUMENTS

| | | |
|---|---|---|
| 957,663 A | 5/1910 | Emslie |
| 1,092,056 A | 3/1914 | Jennings |
| 2,049,321 A | 7/1936 | Sampson |
| 3,326,528 A | 6/1967 | McIntyre, Jr. |
| 4,261,328 A | 4/1981 | Kirk |
| 4,385,585 A | 5/1983 | Lebowitz |
| 4,466,327 A | 8/1984 | Hinton |
| 4,544,830 A | 10/1985 | Miller |

(Continued)

FOREIGN PATENT DOCUMENTS

JP        06-245861 A     9/1994

OTHER PUBLICATIONS

Rutgers, M., Physics Inside a Microwave Oven, Internet Web Site: http://home.earthlink.net/~marutgers/fun/microwave.html, copyright 1999, 10 pages.

(Continued)

*Primary Examiner* — Quang T Van
(74) *Attorney, Agent, or Firm* — Lowe Graham Jones PLLC (57) ABSTRACT

A microwave kettle includes a main vessel having a pivotally attached lid, with an insert attached to an interior of the lid and extending into the main vessel. The insert is configured with a number of nucleation sites to facilitate boiling of a liquid within the vessel.

20 Claims, 9 Drawing Sheets

(56) References Cited

U.S. PATENT DOCUMENTS

| | | | |
|---|---|---|---|
| 4,561,560 A * | 12/1985 | Lyon | B67B 7/28 |
| | | | 220/278 |
| 4,642,443 A | 2/1987 | Jorgensen et al. | |
| 4,645,910 A | 2/1987 | Chhatwal | |
| 4,673,925 A | 6/1987 | Whiteman | |
| 4,692,580 A | 9/1987 | Bell | |
| 4,721,835 A | 1/1988 | Welker | |
| 4,735,191 A | 4/1988 | Boursse et al. | |
| 4,751,359 A | 6/1988 | Jamieson | |
| 4,900,886 A | 2/1990 | Bridges | |
| 4,933,525 A | 6/1990 | St Phillips | |
| 5,038,752 A | 8/1991 | Anson | |
| 5,125,068 A | 6/1992 | McNair et al. | |
| 5,171,952 A | 12/1992 | Waligorski et al. | |
| 5,387,780 A | 2/1995 | Riley | |
| 5,671,325 A | 9/1997 | Roberson | |
| 5,902,620 A | 5/1999 | Nolan | |
| 5,942,143 A | 8/1999 | Hartman et al. | |
| 6,175,105 B1 | 1/2001 | Rubbright et al. | |
| 6,385,585 B1 | 5/2002 | Jonsson et al. | |
| 6,403,938 B2 | 6/2002 | Witonsky et al. | |
| 7,038,181 B2 | 5/2006 | Edmark | |
| 7,516,862 B2 * | 4/2009 | McDonough | A47G 19/2266 |
| | | | 215/229 |
| 2004/0056027 A1 | 3/2004 | Miller | |
| 2005/0229788 A1 * | 10/2005 | White | A47J 27/21175 |
| | | | 99/323 |
| 2016/0045056 A1 | 2/2016 | Kent | |

OTHER PUBLICATIONS

Beaty, W.J., Danger: Coffee Explosion, Unwise Microwave Oven Experiments; http://amasci.com/weird/microexp.html, May 2000, 5 pages, Nov. 22, 2017.

* cited by examiner

MICRO KETTLE

PRIORITY CLAIM

This application claims the benefit of U.S. provisional application Ser. No. 62/038,118, filed Aug. 15, 2014, the contents of which are hereby incorporated by reference.

FIELD OF THE INVENTION

This invention relates generally to the field of beverage and food preparation, and, more particularly, to an apparatus that aids in the proper heating of beverages and liquid-foods in a microwave oven.

BACKGROUND OF THE INVENTION

When using a microwave oven to prepare a hot beverage, the microwave energy causes the water molecules to oscillate and generate heat. In many cases, the objective of heating in a microwave oven is to heat the liquid to the boiling point. The precise amount of time required to boil the liquid is often uncertain, and as a result it is common to heat the liquid for a longer period than is necessary.

On occasion people sometimes forget the liquid has been heated in the microwave, causing them to need to reheat the liquid because it has cooled. The process of reheating the liquid results in removing dissolved oxygen and makes it possible to heat the water above the boiling point, sometimes called "superheating."

Many cups or other containers used to boil water are also quite smooth on their inner surfaces, and the smooth surfaces tend not to be conducive to boiling because they do not contain nucleation sites to facilitate boiling. The combination of imprecise heating, occasional reheating, and containers without nucleation sites makes superheating even more likely.

There have been prior efforts to produce devices that aid in preventing superheating. For example, U.S. Pat. No. 7,038,181 to Edmark describes a lid for placement atop any cup or container, in which the lid includes a stem that extends into the container. The stem is formed from a material having nucleation sites, and therefore it facilitates boiling. The separate lid, however, is imprecise and does not fit all vessels. It also is primarily designed for a single cup or mug, rather than a true kettle for a larger volume. The arrangement of the lid can also be awkward or difficult to use in order to avoid being burned by hot steam escaping from the mug.

SUMMARY OF THE INVENTION

A microwave kettle includes a main vessel having a lid, with an insert attached to an interior of the lid and extending into the main vessel. The insert is configured with a number of nucleation sites to facilitate boiling of a liquid within the vessel.

In one version of the invention, the lid is pivotally attached to the vessel adjacent a handle.

In one example, the lid includes a lever attached to the lid to facilitate the pivotal opening of the lid. The lever and the vessel handle may include features to enable the lid to be secured in the open position. In one example, the lever is formed as a stem with one or more projections that engage an interior surface of a hollow handle to hold the lid in the open position.

In some versions, the insert is formed as a stem extending downward from the lid, with the stem having nucleation sites. The stem may be formed from a relatively rigid material, and may further include a plurality of ribs and channels. Optionally, the insert or stem may be hingedly or flexibly attached to the interior of the lid.

Most preferably, the insert is attached to the lid at a location between the center of the lid and the perimeter of the lid, toward the pivotal connection of the lid to the vessel.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

A preferred microwave kettle (also sometimes called a microkettle) is shown in the figures described above. In the illustrated example, a microwave kettle 10 includes a lower container or vessel 30 and an upper lid 20. Although the term "kettle" is sometimes used in this description, it should be appreciated that the kettle or vessel may vary in size between about 1 cup or less in a smaller version and one quart or more in a large version.

The cup or vessel includes having a floor and upwardly extending sidewalls defining an interior volume. The cup also preferably includes a spout 31 at one end and a handle 40 at an opposing second end. The handle includes an upper end 42 and a lower end 44, and preferably includes a hollow interior 41 at least at the upper end 42 of the handle. In the illustrated example, the handle 40 is substantially cylindrical in shape and is hollow continuously from the upper portion 42 to the lower portion 44. The hollow nature of the handle aids in dissipating heat in order to keep the handle cool even while water is being boiled within the container. In addition, the hollow upper portion of the handle provides a surface for retaining the hinged lid in an open position, as discussed below.

Figure 8:
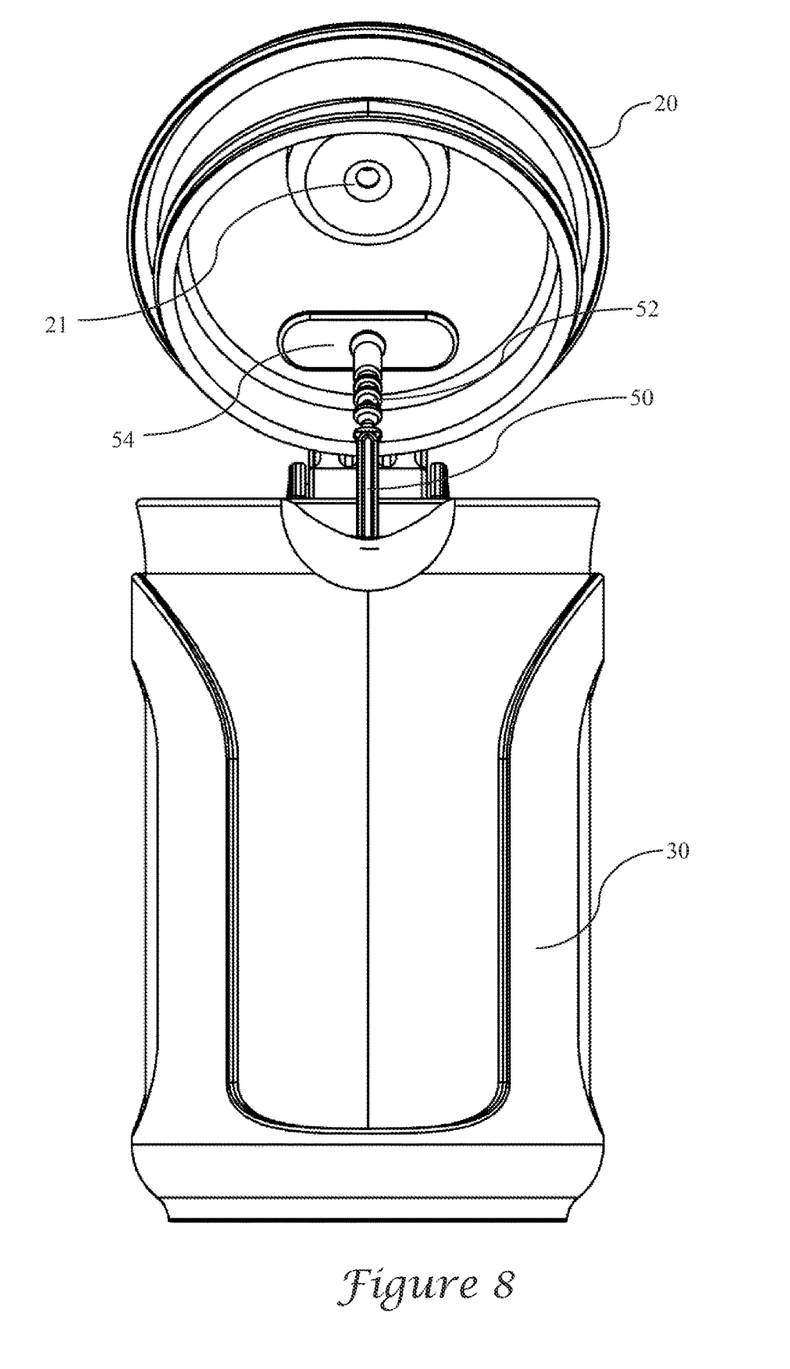
FIG. 8 is a left side view of a preferred microkettle, shown with the lid pivoted to an open position.

The lid 20 includes a steam vent port 21, which in the preferred version is formed to provide a whistle that forms an audible noise when a sufficiently large flow of steam exits from the steam vent port 21 when water is boiling within the vessel. In alternate versions, the steam vent port may simply be an opening at the top of the lid without also being formed as a whistle. Most preferably, the lid includes an annular flange 28 (see FIG. 6) formed about a lower lateral surface of the lid such that the flange engages an upper inner surface of the cup or vessel in order to provide a seal when the lid is seated within the upper part of the vessel. As best seen in FIG. 8, the flange 28 is preferably configured on the lid so that it is positioned beneath the spout 31 when the lid is in the closed position, to further ensure that the container is sealed when the lid is seated in the closed position.

The lid is preferably hingedly attached to the lower container 30 at a hinge 22 provided adjacent the handle 40. In one version, the lid may be permanently attached to the vessel via the hinge, while in other versions the lid may be attached to the vessel at a hinge point but may be removed upon rotation of the lid to a sufficient distance at the hinge axle.

The lid 20 further includes a lateral lid lever or handle 24 extending radially away from the lid in a direction toward the vessel handle 40 and diametrically away from the spout 31. In the illustrated version the lid handle 24 includes a distal opening generally sized to allow a user to press downward against the distal portion of the lid handle 24 with a thumb while gripping the vessel handle 40 with a hand.

Figure 6:
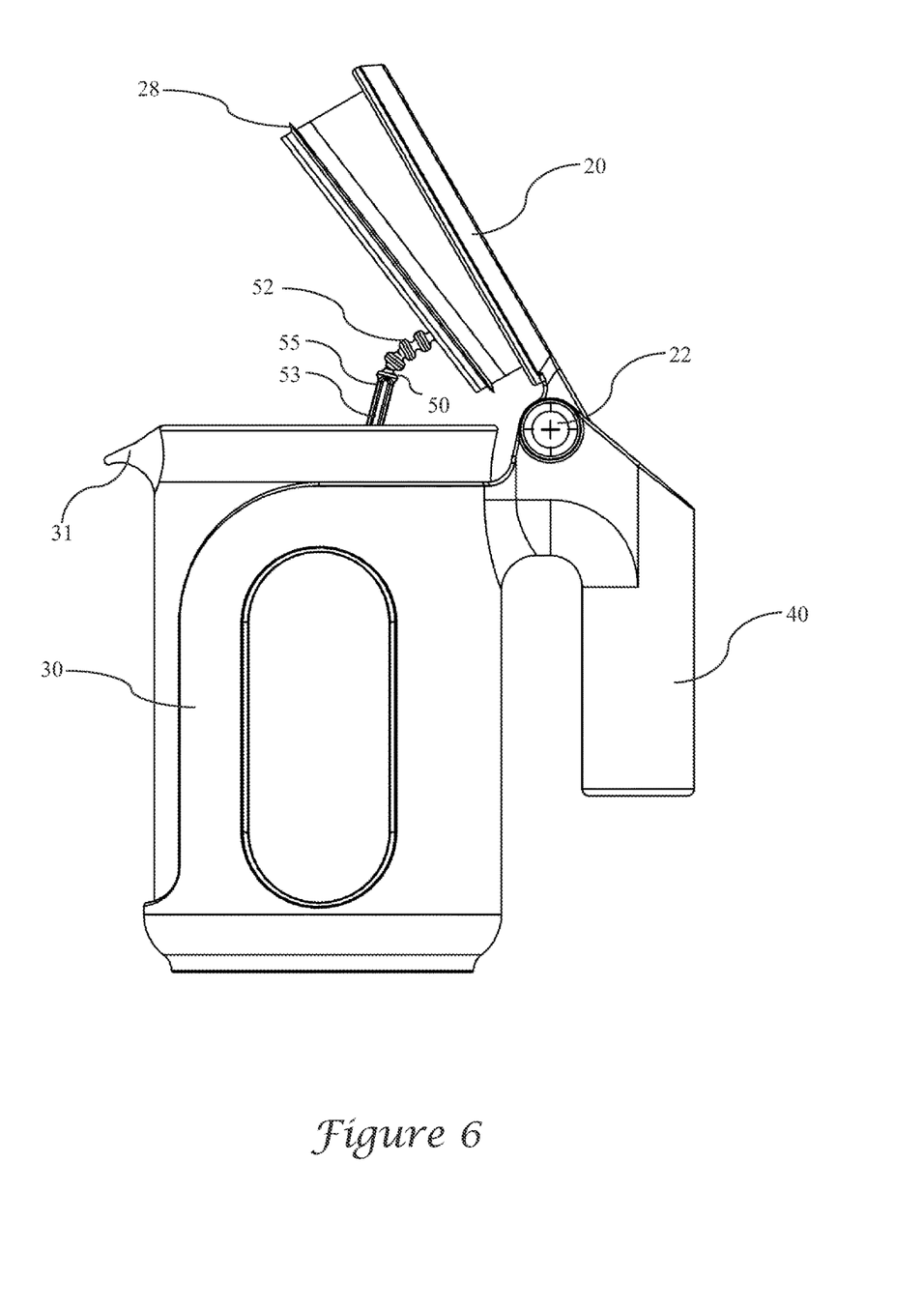
FIG. 6 is a front view of a preferred microkettle, shown with a lid pivoted to an open position.

In one example of the invention, the lateral lid handle 24 further includes one or more frictional engagement surfaces 23 formed on an outer sidewall of the lateral lid handle 24. As illustrated, the lateral lid handle 24 includes a pair of projections 23 extending outwardly in opposing directions (generally perpendicularly to the radial direction of the lateral lid handle) on vertical faces of the lateral lid handle 24. The pair of projections form frictional engagement surfaces 23 and are sized and configured to be snugly received within the upper portion 42 of the hollow interior 41 of the vessel handle 40. Thus, the width between the outer surfaces of the frictional engagement surfaces 23 is slightly greater than the interior width of the hollow interior 41 of the vessel handle 40. As a result, when the lateral lid handle 24 is pivoted downward into the upper hollow interior 41 of the vessel handle 40 (see for example FIGS. 6 and 7), the frictional engagement surfaces 23 are snugly received within the hollow interior. The frictional interaction between the frictional engagement surfaces 23 and a hollow interior 41 of the vessel handle 40 serves to retain the lid 20 in and open position (that is, the position as illustrated in FIG. 6), hinged upward from the vessel 30. In a preferred version, the frictional engagement surfaces 23 are formed from a resilient material or a thermoplastic elastomer, such as rubber, silicone, santoprene, or others.

In other examples of the invention, the lateral lid handle and interior dimensions of the hollow vessel handle may be sized and configured to provide a snug frictional fit within one another without the use of additional frictional engagement surface materials.

The structure of the pivot in the lid and handle allow for one-handed operation in which hot water or other liquid from within the vessel 30 may be poured from the vessel with the lid in the open position. In the absence of a feature such as described above that can effectively lock or retain the lid in an open position, a user may have difficulty pouring hot liquid from the vessel in a controlled manner while focusing attention on keeping the lid open at the same time.

An inner surface of the lid further includes a hanging insert, which in the preferred version is configured as a stem 50 attached to the lid at a mount 54 positioned at a rearward location generally adjacent the hinge and opposite the steam port and spout. The upper portion of the stem 50 is formed in a manner allowing it to be flexible and to bend in a manner that enables the lowest portion 56 of the stem to remain within the vessel even when the lid is in an open position.

The hanging insert, or stem 50, is preferably formed from material or with a texture that provides nucleation sites to facilitate boiling the water or other liquid within the vessel.

In some versions of the invention, the stem is formed from a plastic material that is configured with a raised surface having bumps, cracks, crevices, or which is otherwise not smooth over the outer surface. The generally roughened outer surface of the stem provides the nucleation sites in order to facilitate boiling. In another version of the invention, the outer surface of the stem may be relatively smooth, but is formed with alternating elongated ribs 55 and elongated channels 53 extending from the upper portion of the stem to the lower portion of the stem. The space in the channels between adjacent ribs provides nucleation sites. In yet other examples, the stem may be formed in whole or in part from a particular material that is rich in nucleation sites such as ceramic, pumice, or others.

Figure 9:
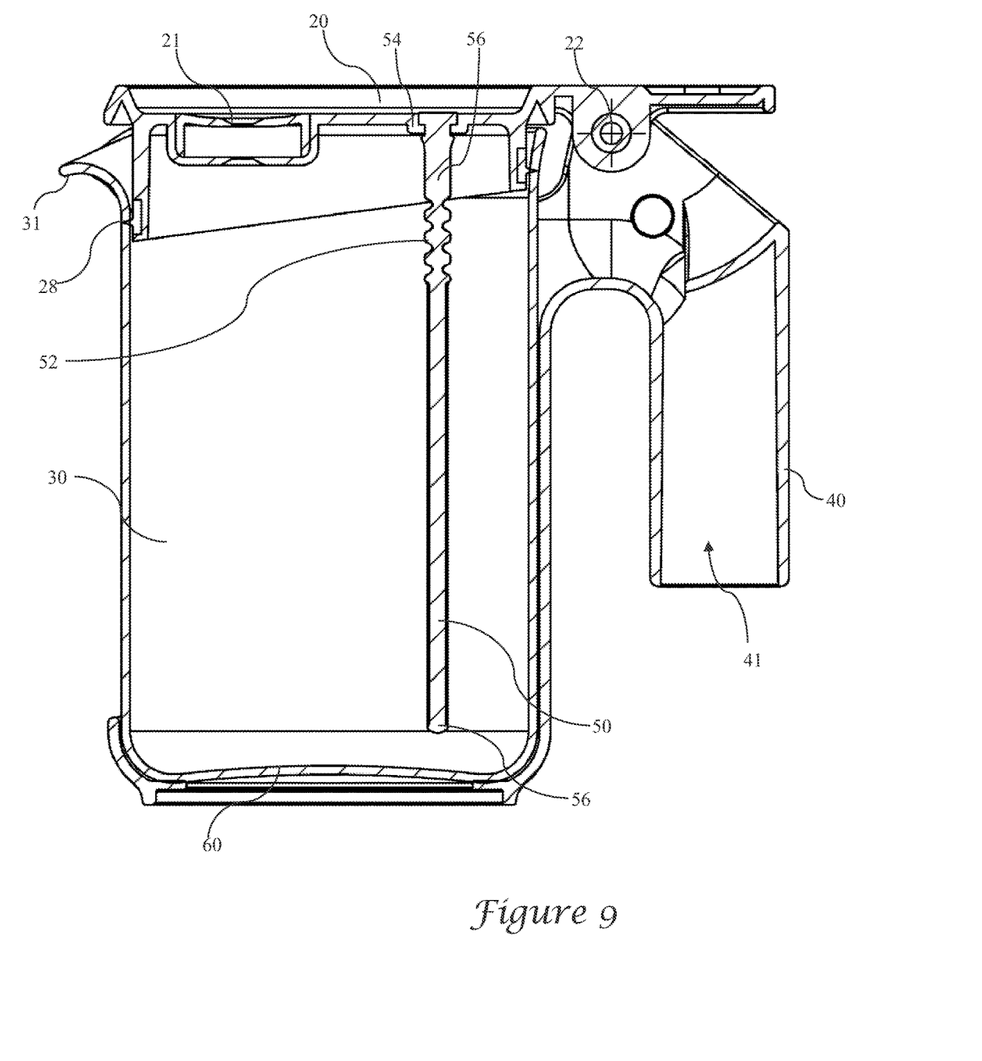
FIG. 9 is a sectional view of a preferred microkettle, taken along section line 9-9 in FIG. 5.

As noted above, the upper portion of the stem includes a hinge 52 allowing the stem to be flexibly retained within the vessel. The hinge may be formed as a living hinge configured within the material itself, or may be formed as a pivot point or axle joining the stem to the lid. In the illustrated version, such as seen in FIG. 9, the hinge is formed as a living hinge with a plurality of adjacent sections of narrowed circumferences along the upper portion of the stem. Most preferably, the insert or stem includes an upper rigid portion 56 attached to the lid, a living hinge positioned at about the level of the spout, and an elongated rigid stem portion. Alternately, the hinge may be formed as a short section of a metal bead chain linking the stem to the inner portion of the lid. In yet another example, the upper portion of the stem may be formed with a series of balls as illustrated, in which the series of balls is integrally formed within the plastic or other material and in which the narrowed material between each of the balls is more flexible and allows the stem to bend into the vessel as the lid is pivoted upward or downward.

Most preferably, the stem 50 is sized and configured such that the lowest portion of the stem 56 extends nearly to the bottom 60 of the vessel 30 when the lid is hinged into a closed position, as best seen in FIG. 9.

Figure 1:
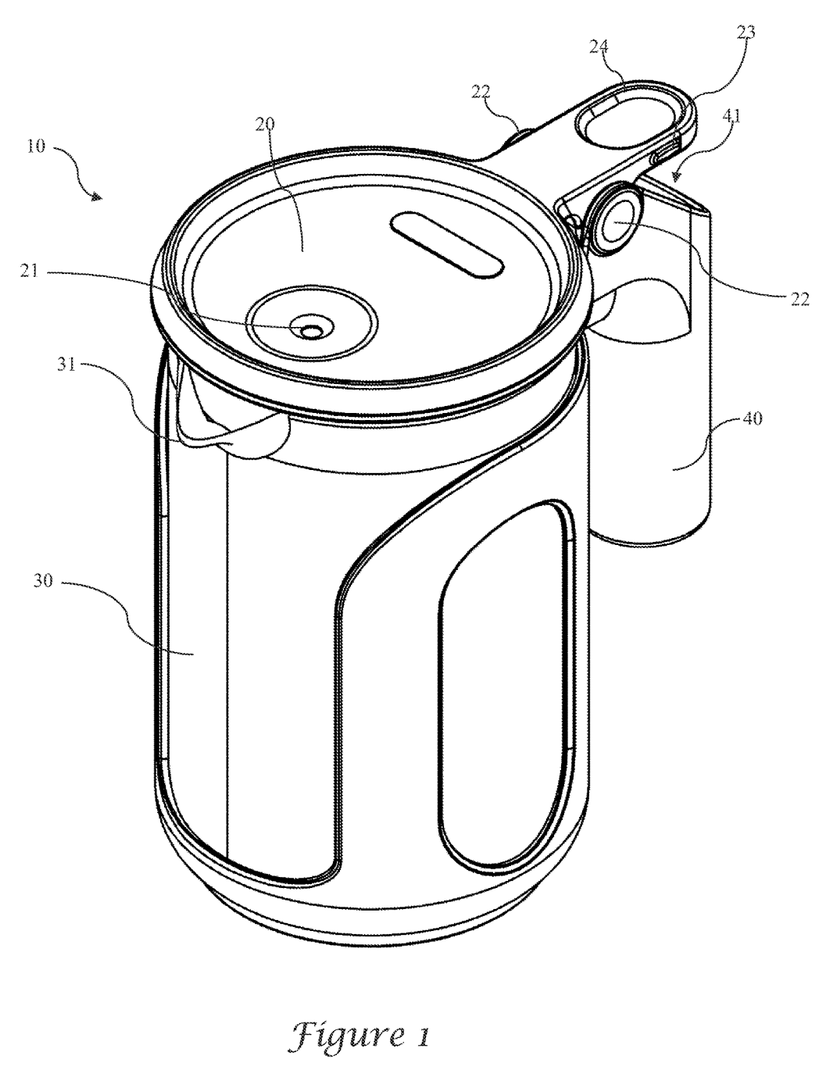
FIG. 1 is a top perspective view of a preferred microkettle.
Figure 2:
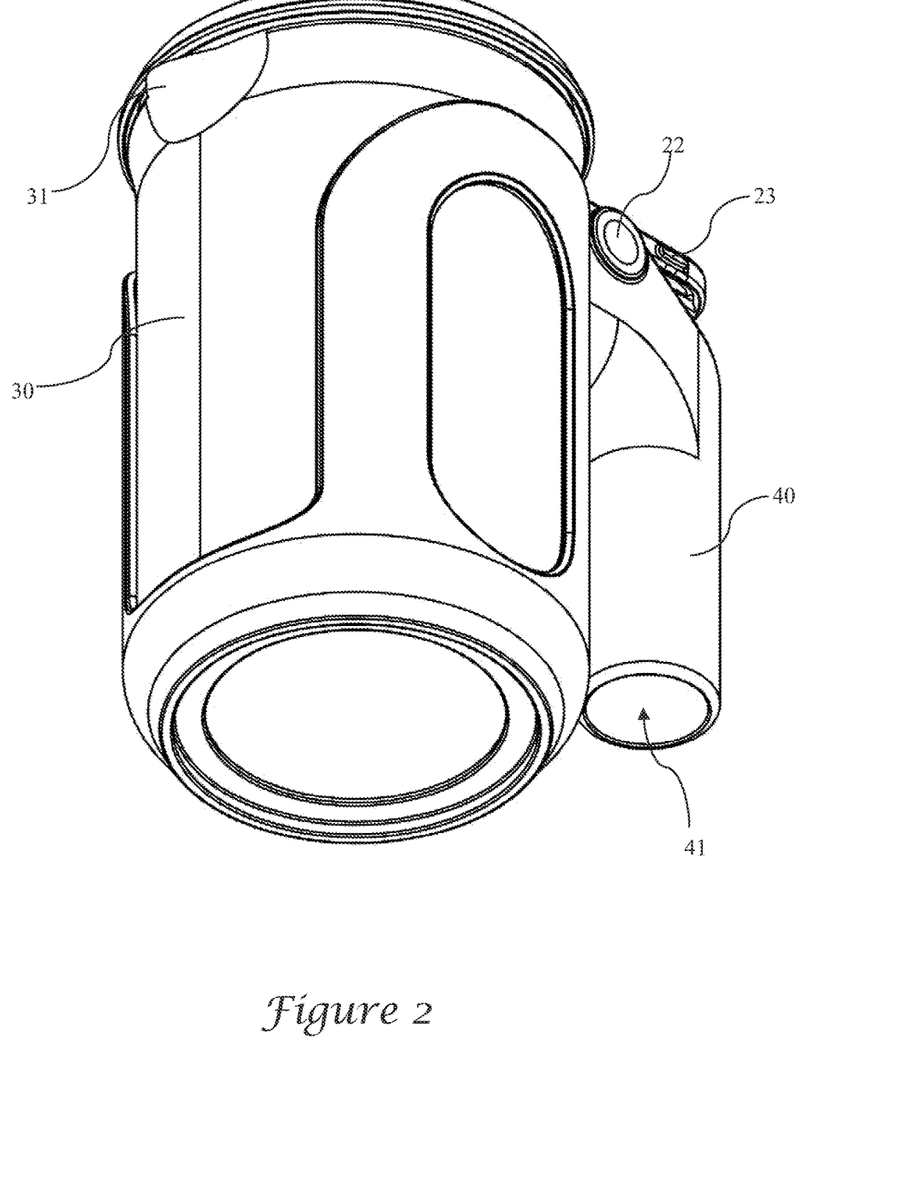
FIG. 2 is a bottom perspective view of a preferred microkettle.
Figure 3:
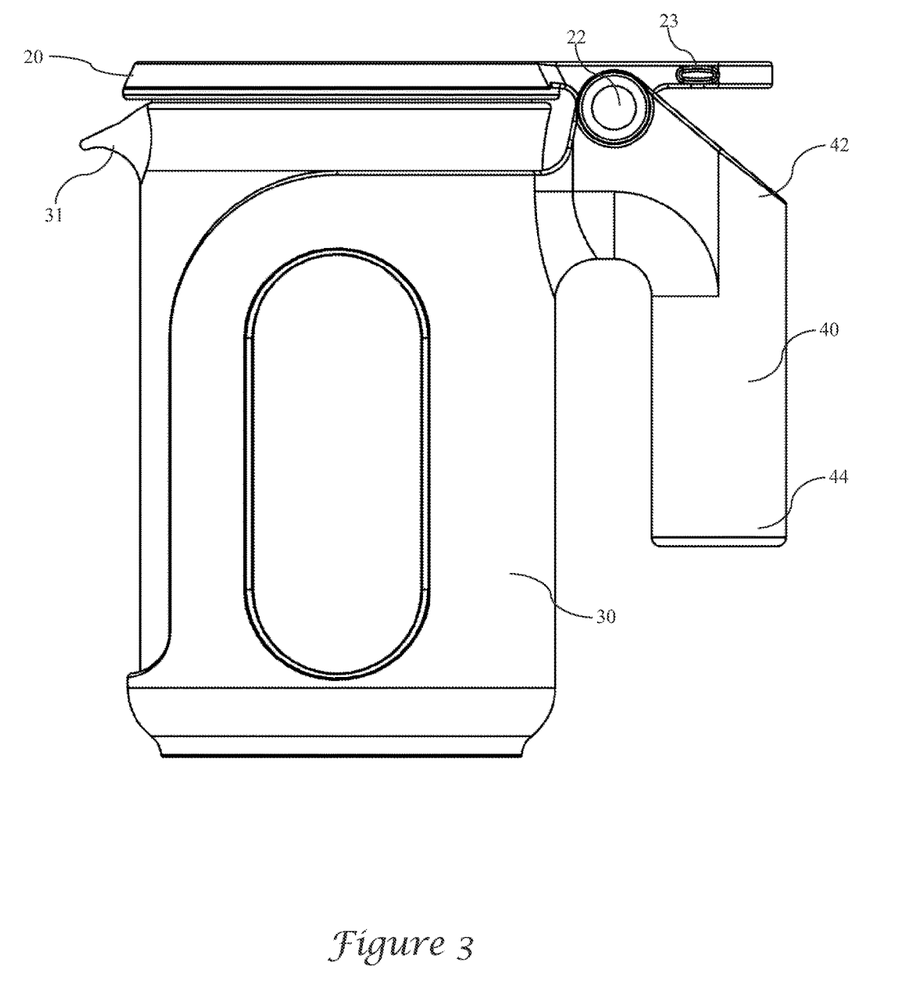
FIG. 3 is a front view of a preferred microkettle.
Figure 4:
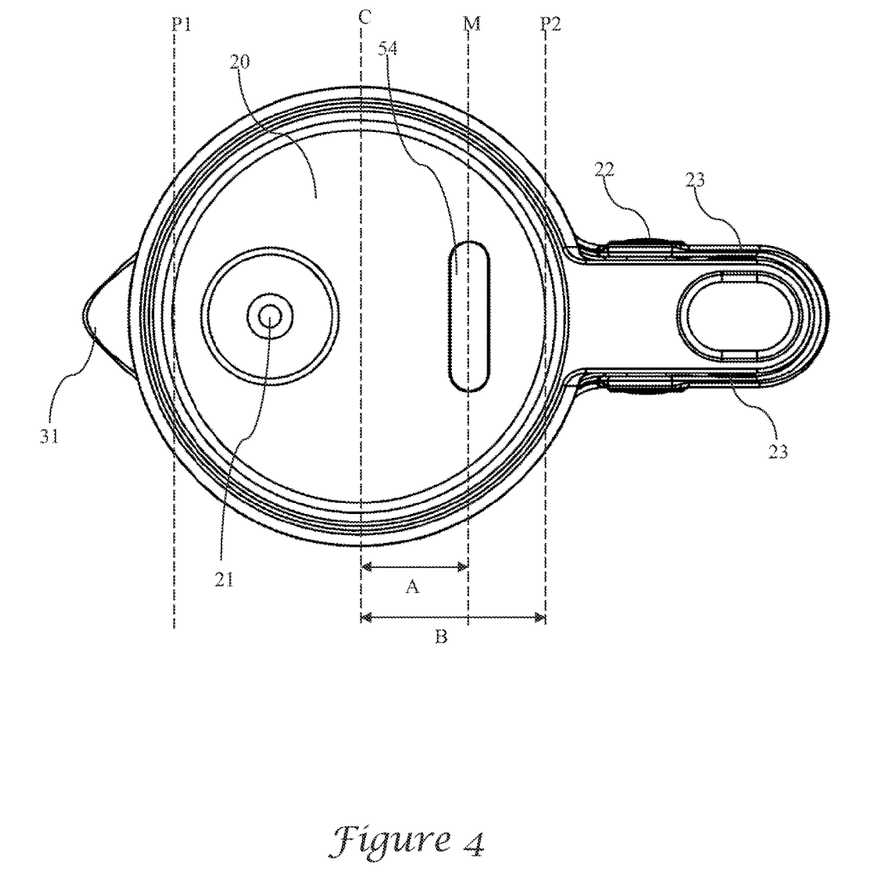
FIG. 4 is a top view of a preferred microkettle.
Figure 5:
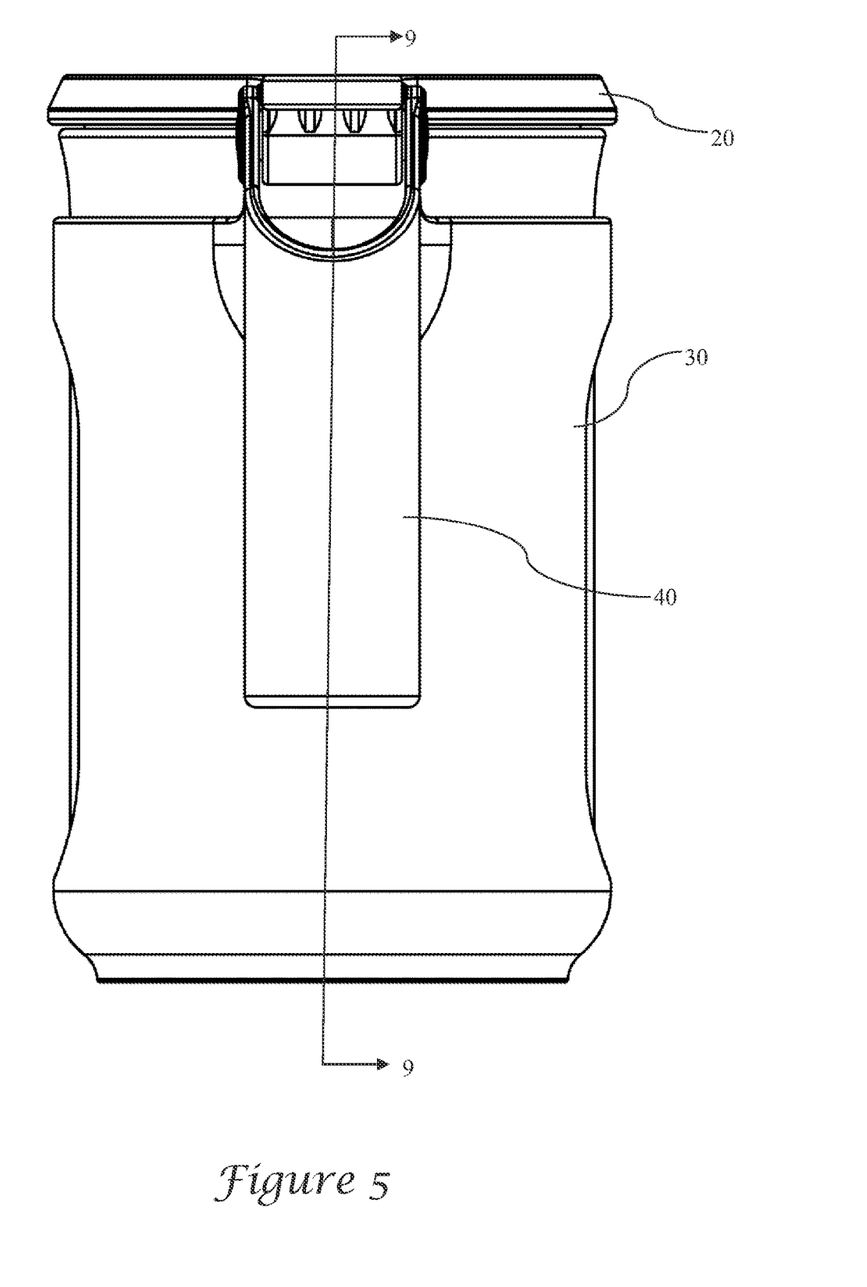
FIG. 5 is a right side view of a preferred microkettle.

In the preferred version, with reference to FIG. 4, the stem is attached to the lid via a mount 54 positioned at a distance A (indicated by line M) from the center of the lid (indicated by diameter line C) toward the perimeter of the lid (indicated by lines P1 and P2), in which the mount is located more closely adjacent to the hinge than to the spout, and in which the circular lid defines a radial distance B, so that the central diameter is midway between the perimeter tangent lines P1 and P2. Most preferably, the distance A is greater than or equal to one half of the radius of the lid; that is, the distance A is greater than or equal to one half of the radial distance B. This location for the attachment of the stem helps to ensure that the stem is positioned within the vessel when the lid is in the lowered position, without the stem abutting the interior sidewall of the vessel. Likewise, it allows the stem to be raised effectively when the lid is hinged to the open position.

Figure 7:
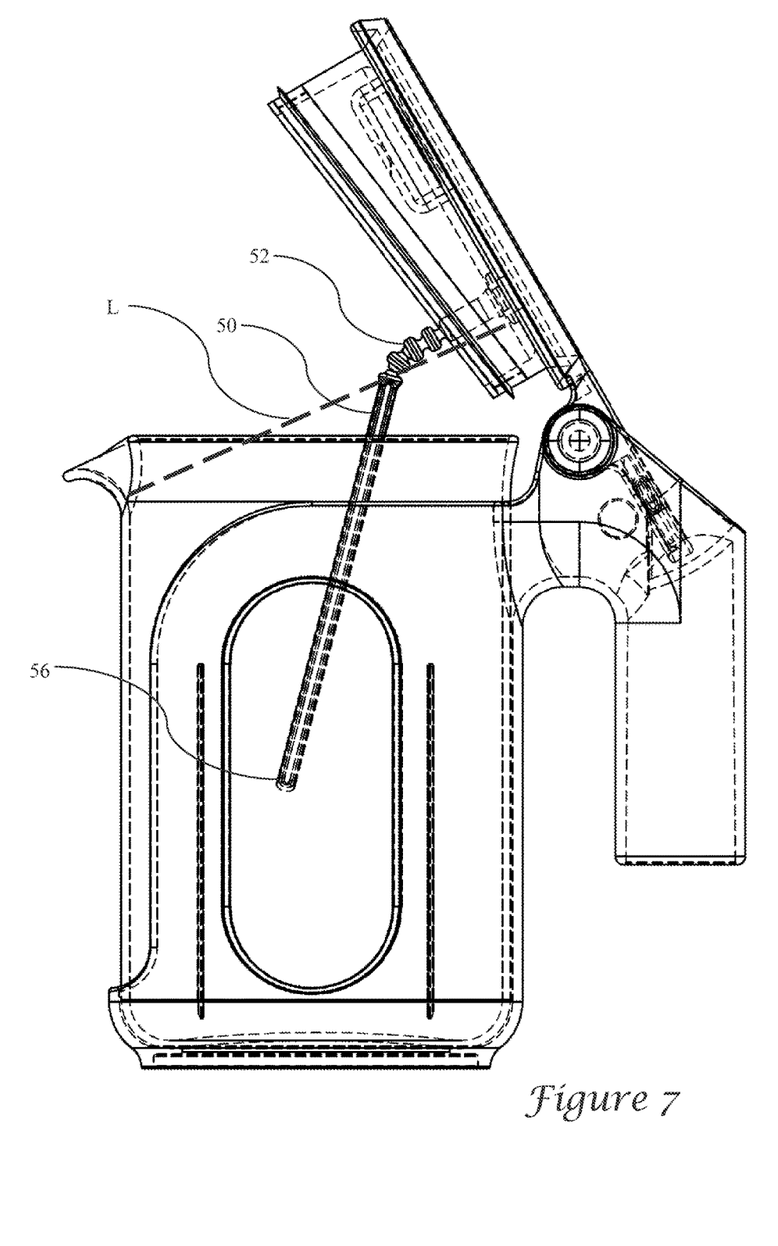
FIG. 7 is a front view of a preferred microkettle as in FIG. 6, with interior features illustrated in broken lines.

The length of the stem 50 further ensures that the stem will be retained within the vessel even when the lid is hinged to the open position and the vessel is tipped for pouring. For example, as seen in FIG. 7, an added dashed line L extends from the interior of the lid to the upper end of the sidewalls. If the inset or stem is shorter than the line L, then it may be able to pivot beyond the rim of the vessel when the vessel is tipped. But if the insert is longer than the line L, it will abut the vessel sidewalls when the vessel is tipped, so that the sidewalls will retain the insert within the interior volume. In such a configuration, the lower end 56 of the stem 50 may hinge toward the spout end of the vessel, but the stem is sufficiently long that it will not travel out of the vessel. In one example of the invention, the stem is at least as long as one half of the height of the vessel. More preferably it is at least three quarters of the height of the vessel.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A microkettle, comprising:
a vessel having a floor and upwardly extending sidewalls defining an interior volume;
a cup handle positioned on an outer portion of the vessel;
a lid pivotally attached to the vessel at a pivot location, the lid having a lid lever operable to pivot the lid between a closed position in which the lid encloses the interior volume and an open position in which the lid is rotated to enable access to the interior volume; and
an insert attached to the lid and extending into the interior volume when the lid is in the closed position, the insert having one or more channels and one or more ribs configured to provide nucleation sites to facilitate boiling when a liquid is heated in the vessel.

2. The microkettle of claim 1, wherein the insert is attached to an interior surface of the lid.

3. The microkettle of claim 2, wherein the insert is attached a location between the center of the lid and the pivot location.

4. The microkettle of claim 3, wherein the insert comprises a stem.

5. The microkettle of claim 4, wherein the stem is pivotally attached to the lid.

6. The microkettle of claim 5, wherein the stem comprises a living hinge.

7. The microkettle of claim 3, further comprising a means for holding the lid in the open position.

8. The microkettle of claim 3, wherein the handle comprises a hollow interior and wherein the lid lever is sized and configured to be received within the hollow interior of the handle, wherein frictional engagement of the lid lever and the hollow interior of the handle is sufficient to hold the lid in the open position.

9. The microkettle of claim 8, further comprising at least one resilient projection attached to the lid lever, the resilient projection engaging the hollow interior of the handle when the lid is in the open position.

10. The microkettle of claim 3, further comprising a whistle formed in the lid.

11. The microkettle of claim 3, wherein the vessel further comprises a spout.

12. The microkettle of claim 3, wherein the lid further comprises a circumferential flange, the flange operating to seal the interior volume when the lid is in the closed position.

13. A microkettle, comprising:
a vessel having a floor and upwardly extending sidewalls defining an interior volume, the sidewalls terminating in an open-topped rim of the vessel;
a cup handle positioned on an outer portion of the vessel;
a lid pivotally attached to the vessel at a pivot location located at a juncture of the vessel sidewall and the cup handle, the lid having a lid lever operable to pivot the lid between a closed position in which the lid encloses the interior volume and an open position in which the lid is rotated to enable access to the interior volume; and
an insert attached to an interior surface of the lid at a mount and extending into the interior volume when the lid is in the closed position, the insert being configured to provide nucleation sites to facilitate boiling when a liquid is heated in the vessel, the insert further extending into the interior volume when the lid is in the open position.

14. The microkettle of claim 13, wherein the insert extends substantially to the floor of the vessel when the lid is in the closed position.

15. The microkettle of claim 14, wherein the lid lever is configured to engage a surface on the handle when the lid is pivoted to the open position to hold the lid in the open position.

16. The microkettle of claim 15, wherein the insert further comprises one or more channels and one or more ribs.

17. A microkettle, comprising:
a vessel having a floor and upwardly extending sidewalls defining an interior volume, the sidewalls terminating in an open-topped rim of the vessel;
a cup handle positioned on an outer portion of the vessel;
a lid pivotally attached to the vessel at a pivot location located at a juncture of the vessel sidewall and the cup handle, the lid having a lid lever operable to pivot the lid between a closed position in which the lid encloses the interior volume and an open position in which the lid is rotated to enable access to the interior volume; and
an insert attached to an interior surface of the lid at a mount and extending into the interior volume when the lid is in the closed position, the insert being configured to provide nucleation sites to facilitate boiling when a liquid is heated in the vessel;
wherein the insert comprises an upper rigid portion attached to the lid, an intermediate living hinge, and a lower rigid portion.

18. The microkettle of claim 17, wherein the insert is longer than a distance from the mount to the upper end of the sidewall diametrically opposite the pivot location, whereby the insert is retained within the interior volume.

19. The microkettle of claim 17, wherein the insert extends substantially to the floor of the vessel when the lid is in the closed position.

20. The microkettle of claim 17, wherein the insert further comprises one or more channels and one or more ribs.

* * * * *